US010781753B2

(12) United States Patent
Hartshorn et al.

(10) Patent No.: US 10,781,753 B2
(45) Date of Patent: Sep. 22, 2020

(54) MULTI-LAYER THERMAL INSULATOR APPARATUS AND METHODS

(71) Applicant: The Boeing Company, Chicago, IL (US)

(72) Inventors: Scott D. Hartshorn, Bellevue, WA (US); Keith D. Humfeld, Federal Way, WA (US)

(73) Assignee: THE BOEING COMPANY, Chicago, IL (US)

( * ) Notice: Subject to any disclaimer, the term of this patent is extended or adjusted under 35 U.S.C. 154(b) by 337 days.

(21) Appl. No.: 15/582,010

(22) Filed: Apr. 28, 2017

(65) Prior Publication Data

US 2018/0313272 A1 Nov. 1, 2018

(51) Int. Cl.
*F02C 7/24* (2006.01)
*F02K 1/64* (2006.01)
*F02C 7/04* (2006.01)
*F02K 3/06* (2006.01)
*F02K 1/82* (2006.01)
*B64D 33/04* (2006.01)
*B64D 27/16* (2006.01)

(52) U.S. Cl.
CPC .................. *F02C 7/24* (2013.01); *F02C 7/04* (2013.01); *F02K 1/64* (2013.01); *F02K 1/822* (2013.01); *F02K 3/06* (2013.01); *B64D 27/16* (2013.01); *B64D 33/04* (2013.01); *F05D 2220/323* (2013.01); *F05D 2230/60* (2013.01); *F05D 2260/231* (2013.01)

(58) Field of Classification Search
CPC ... F02K 1/64; F02K 1/822; F02K 3/06; F05D 2260/23; F05D 2260/323; B64D 27/16; B32B 7/00; B32B 7/027; B32B 5/00; B32B 5/26
See application file for complete search history.

(56) References Cited

U.S. PATENT DOCUMENTS

| | | | |
|---|---|---|---|
| 3,715,265 A * | 2/1973 | Allen | C09K 5/14 428/143 |
| 4,576,845 A | 3/1986 | Krotchko | |
| 5,766,745 A | 6/1998 | Smith et al. | |
| 6,931,834 B2 * | 8/2005 | Jones | F28D 15/02 257/E23.088 |
| 10,024,792 B2 * | 7/2018 | Toivola | B64F 5/60 |
| 2012/0285138 A1 * | 11/2012 | Todorovic | F02C 7/14 60/230 |
| 2014/0246929 A1 | 9/2014 | Francese et al. | |
| 2015/0053086 A1 * | 2/2015 | Rebouillat | B32B 7/02 96/11 |

(Continued)

OTHER PUBLICATIONS

Ruag Space GMBH, "Thermal Insulation Products", May 2014 (28 pages).

*Primary Examiner* — Steven M Sutherland
*Assistant Examiner* — Rodolphe Andre Chabreyrie
(74) *Attorney, Agent, or Firm* — Hanley, Flight & Zimmerman, LLP

(57) ABSTRACT

Multi-layer thermal insulator apparatus and methods are described. An example multi-layer thermal insulator includes a first thermally insulating layer, a second thermally insulating layer, and a thermally conductive layer positioned between and adjacent to the first thermally insulating layer and the second thermally insulating layer.

20 Claims, 8 Drawing Sheets

(56) References Cited

U.S. PATENT DOCUMENTS

| | | | |
|---|---|---|---|
| 2015/0198092 A1* | 7/2015 | Weiner | F01D 25/12 415/175 |
| 2016/0010589 A1* | 1/2016 | Rolt | F01D 13/003 60/226.1 |
| 2016/0265383 A1* | 9/2016 | Pujar | F01D 25/145 |
| 2018/0058475 A1* | 3/2018 | Strait | F04D 29/644 |

* cited by examiner

MULTI-LAYER THERMAL INSULATOR APPARATUS AND METHODS

FIELD OF THE DISCLOSURE

This disclosure relates generally to thermal insulators and, more specifically, to multi-layer thermal insulator apparatus and methods.

BACKGROUND

Thermal protection is implemented in a variety of aircraft systems, including in and/or on structures of aircraft engines e.g., commercial aircraft engines) where high temperatures are generated and/or emitted as a result of combustion processes occurring in the cores of the engines. Thermal protection may be implemented via either a passive thermal protection system or an active thermal protection system.

Conventional passive thermal protection systems for aircraft engines include the application of a layer of thermal insulation (e.g., an insulating material coated with a fireproof material) in and/or on one or more portion(s) of the aircraft engine. Conventional active thermal protection systems for aircraft engines include air-cooled and/or fluid-cooled components mounted on and/or integrated in one or more portion(s) of the aircraft engine.

SUMMARY

Multi-layer thermal insulator apparatus and methods are disclosed herein. In some examples, a multi-layer thermal insulator is disclosed. In some disclosed examples, the multi-layer thermal insulator comprises a first thermally insulating layer, a second thermally insulating layer, and a thermally conductive layer positioned between and adjacent to the first thermally insulating layer and the second thermally insulating layer.

In some examples, an aircraft engine is disclosed. In some disclosed examples, the aircraft engine comprises a composite thrust reverser having an inner wall. In some disclosed examples, the aircraft engine further comprises a multi-layer thermal insulator positioned along the inner wall. In some disclosed examples, the multi-layer thermal insulator includes a first thermally insulating layer, a second thermally insulating layer, and a thermally conductive layer positioned between and adjacent to the first thermally insulating layer and the second thermally insulating layer.

In some examples, a method of positioning a multi-layer thermal insulator is disclosed. In some disclosed examples, the method comprises positioning a multi-layer thermal insulator along an inner wall of a composite thrust reverser of an aircraft engine. In some disclosed examples, the multi-layer thermal insulator includes a first thermally insulating layer, a second thermally insulating layer, and a thermally conductive layer positioned between and adjacent to the first thermally insulating layer and the second thermally insulating layer.

In some examples, a method of distributing heat via a multi-layer thermal insulator is disclosed. In some disclosed examples, the method comprises applying heat to a first thermally insulating layer of a multi-layer thermal insulator. In some disclosed examples, the method further comprises transferring the applied heat from the first thermally insulating layer to a thermally conductive layer of the multi-layer thermal insulator positioned between and adjacent to the first thermally insulating layer and a second thermally insulating layer of the multi-layer thermal insulator. In some disclosed examples, the methods further comprises distributing the transferred heat across the thermally conductive layer. In some disclosed examples, the method further comprises transferring the distributed heat from the thermally conductive layer to the second thermally insulating layer.

Figure 1:
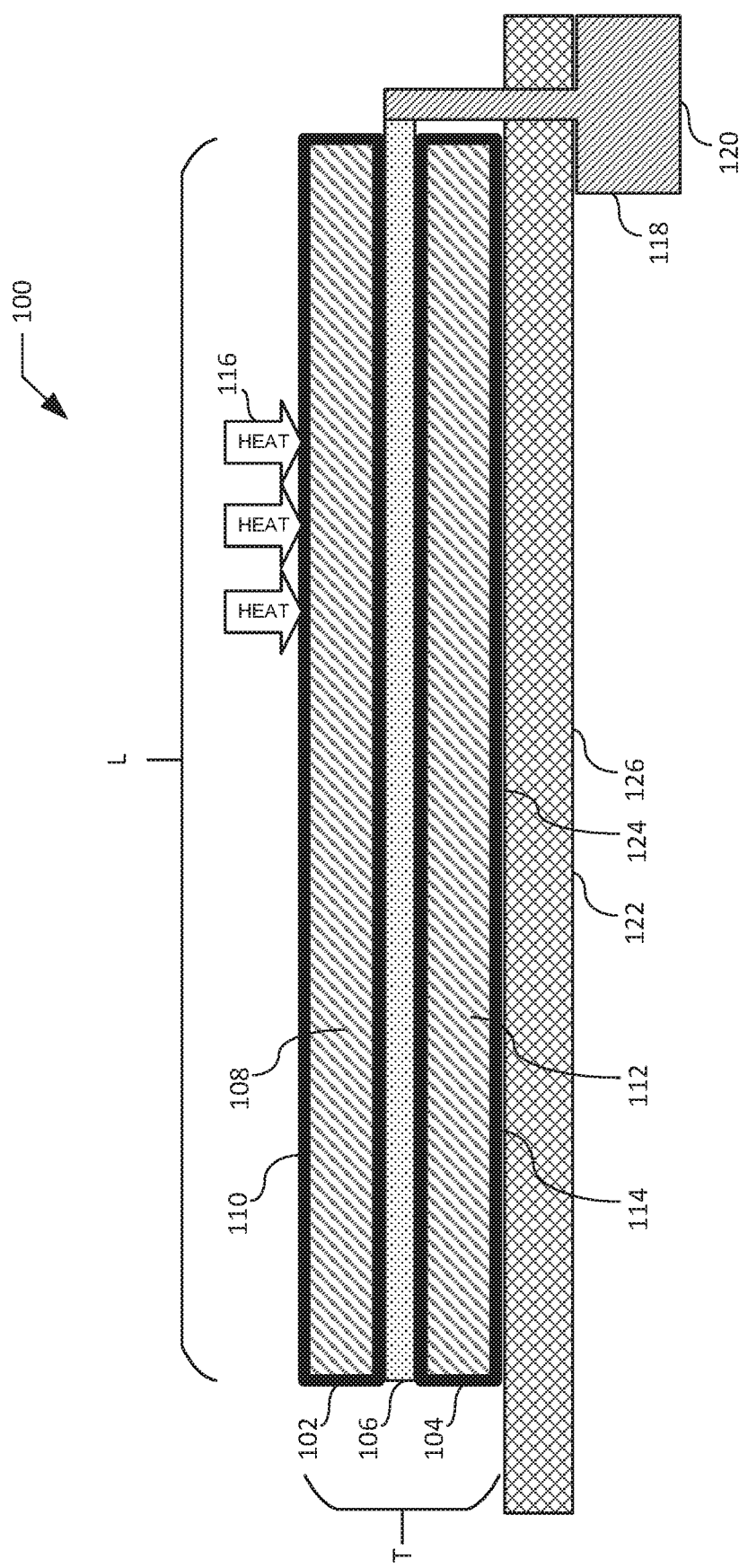
FIG. 1 is a cross-sectional view illustrating a first example multi-layer al insulator constructed in accordance with the teachings of this disclosure.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness.

DETAILED DESCRIPTION

As used herein, the term "layer" refers to a sheet of material having a thickness. Conventional passive thermal protection systems for aircraft engines include the application of a layer of thermal insulation (e.g., an insulating material coated with a fireproof material) in and/or on one or more portion(s) of the aircraft engine. Such conventional passive thermal protection systems have several drawbacks. For example, to obtain a sufficient degree of thermal protection, the layer of thermal insulation may need to be relatively thick. At times, the thickness of the insulating material needed to provide the desired degree of thermal protection may exceed space constraints associated with the portion(s) of the aircraft engine into which and/or on which the insulating material is to be positioned and/or installed. Additionally, localized hot spots may develop within the layer of insulating material. The formation of such localized hot spots damages the insulating material itself, and may also result in damage to the portion(s) of the aircraft engine which the layer of insulating material is intended to thermally protect. Such a scenario may occur even though a majority of the layer of insulating material is at a permissible and/or desirable temperature.

When conventional passive thermal protection systems are insufficient, one or more active thermal protection system(s) may be implemented to obtain a sufficient degree of thermal protection. Conventional active thermal protection systems for aircraft engines include air-cooled and/or fluid-cooled components mounted on and/or integrated in one or more portion(s) of the aircraft engine. Such conventional active thermal protection systems have several drawbacks. For example, conventional active thermal protection systems tend to be more expensive and more susceptible to failure (e.g., mechanical and/or electrical failure associated with moving parts and/or moving fluids) relative to the above-described conventional passive thermal protection systems.

Unlike the conventional passive thermal protection systems described above, the multi-layer thermal insulator apparatus disclosed herein advantageously distribute heat across a multi-layer thermal insulator via a thermally conductive layer positioned between and adjacent to first and second thermally insulating layers of the multi-layer thermal insulator. As a result of heat being distributed across the thermally conductive layer of the multi-layer thermal insulator, the formation of localized hot spots within one or more thermally insulating layer(s) of the multi-layer thermal insulator is reduced (e.g., eliminated), thereby providing improved thermal protection relative to the conventional passive thermal protection systems described above. The disclosed multi-layer thermal insulator apparatus are accordingly able to provide a sufficient degree of thermal protection utilizing a multi-layer thermal insulator having a first thickness that is less than (e.g., thinner than) a second thickness of a conventional passive thermal protection system that would be required to provide the same degree of thermal protection.

The disclosed multi-layer thermal insulator apparatus also provide several advantages over the conventional active thermal protection systems described above. For example, the disclosed multi-layer thermal insulator apparatus may be implemented in a manner that is less costly and less susceptible to failure relative to such conventional active thermal protection systems.

Figure 2:
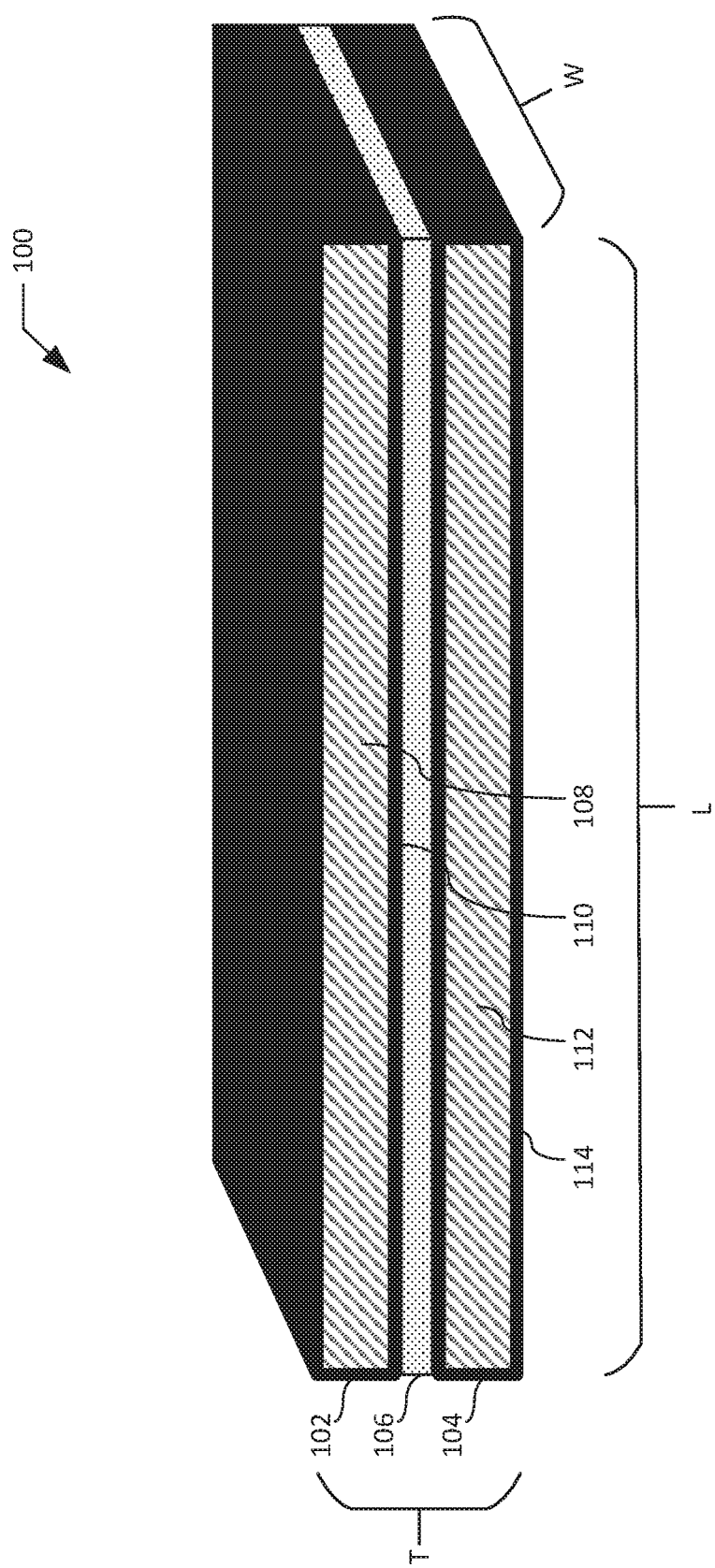
FIG. 2 is a perspective view of the first example multi-layer thermal insulator of FIG. 1.

FIG. 1 is a cross-sectional view illustrating a first example multi-layer thermal insulator 100 constructed in accordance with the teachings of this disclosure. FIG. 2 is a perspective view of the multi-layer thermal insulator 100 of FIG. 1. The multi-layer thermal insulator 100 of FIGS. 1 and 2 includes a first example thermally insulating layer 102, a second example thermally insulating layer 104, and an example thermally conductive layer 106 (e.g., a first thermally conductive layer) positioned between and adjacent to the first thermally insulating layer 102 and the second thermally insulating layer 104. The multi-layer thermal insulator 100 has an example length (indicated as the dimension "L" in FIGS. 1 and 2), an example width (indicated as the dimension "W" in FIG. 2), and an example thickness (indicated as the dimension "T" in FIGS. 1 and 2). The first thermally insulating layer 102, the second thermally insulating layer 104, the thermally conductive layer 106, and/or, more generally, the multi-layer thermal insulator 100 of FIGS. 1 and 2 may be of any size and/or shape, including the size(s) and shapes(s) illustrated in connection with FIGS. 1 and 2.

In the illustrated example of FIGS. 1 and 2, the thermally conductive layer 106 of the multi-layer thermal insulator 100 is adjacent (e.g., abuts and/or is in contact with) both the first thermally insulating layer 102 and the second thermally insulating layer 104 of the multi-layer thermal insulator 100. In other examples, one or more gap(s) may exist between the thermally conductive layer 106 and one or more of the first thermally insulating layer 102 and/or the second thermally insulating layer 104. In some examples, the thermally conductive layer 106 may be coupled (e.g., joined, fastened, bonded, etc.) to one or more of the first thermally insulating layer 102 and/or the second thermally insulating layer 104.

In some examples, the multi-layer thermal insulator 100 of FIGS. 1 and 2 may include one or more additional thermally insulating layer(s) and/or one or more additional thermally conductive layer(s). For example, the multi-layer thermal insulator 100 of FIGS. 1 and 2 may further include a third thermally insulating layer, and a second thermally conductive layer positioned between and adjacent to the third thermally insulating layer and one of the first or second thermally insulating layers 102, 104 of FIGS. 1 and 2.

In the illustrated example of FIGS. 1 and 2, the first thermally insulating layer 102 of the multi-layer thermal insulator 100 includes a first example insulating material 108 and a first example face sheet material 110. The first face sheet material 110 covers (e.g., coats and/or surrounds) the first insulating material 108. In some examples, the first face sheet material 110 may be implemented as a fireproof material to protect the first insulating material 108 from exposure to flames and/or fire. In some examples, the first insulating material 108 may include at least one of filament reinforced pyrogenic silica, fiberglass, silica, ceramic fibers, aerogel, mineral wool, cellulose, polyurethane, and/or polystyrene. In some examples, the first face sheet material 110 may include polyimide. In examples where the first face sheet material 110 is implemented as a fireproof material, the first face sheet material 110 may include at least one of steel, titanium, and/or nickel.

In the illustrated example of FIGS. 1 and 2, the second thermally insulating layer 104 of the multi-layer thermal insulator 100 includes a second example insulating material 112 and a second example face sheet material 114. The second face sheet material 114 covers (e.g., coats and/or surrounds) the second insulating material 112. In some examples, the second face sheet material 114 may be implemented as a fireproof material to protect the second insulating material 112 from exposure to flames and/or fire. In some examples, the second insulating material 112 may include at least one of filament reinforced pyrogenic silica, fiberglass, silica, ceramic fibers, aerogel, mineral wool, cellulose, polyurethane, and/or polystyrene. In some examples, the second face sheet material 114 may include polyimide. In examples where the second face sheet material 114 is implemented as a fireproof material, the second face sheet material 114 may include at least one of steel, titanium, and/or nickel.

In some examples, the second insulating material 112 of the second thermally insulating layer 104 of FIGS. 1 and 2 may include the same material(s) as the first insulating material 108 of the first thermally insulating layer 102 of FIGS. 1 and 2. In other examples, the second insulating material 112 of the second thermally insulating layer 104 may include different material(s) relative to the material(s) of the first insulating material 108 of the first thermally insulating layer 102. In some examples, the second face sheet material 114 of the second thermally insulating layer 104 of FIGS. 1 and 2 may include the same material(s) as the first face sheet material 110 of the first thermally insulating layer 102 of FIGS. 1 and 2. In other examples, the second face sheet material 114 of the second thermally insulating layer 104 may include different material(s) relative to the material(s) of the first face sheet material 110 of the first thermally insulating layer 102. For example, the first face sheet material 110 may be implemented as a fireproof material (e.g., steel, titanium, and/or nickel), and the second face sheet material 114 may be implemented as polyimide and/or another non-fireproof material. In still other examples, the first thermally insulating layer 102 and/or the second thermally insulating layer 104 may lack a face sheet material coating.

In the illustrated example of FIGS. 1 and 2, the thermally conductive layer 106 of the multi-layer thermal insulator 100 is positioned between and adjacent to the first thermally insulating layer 102 and the second thermally insulating layer 104. In some examples, the thermally conductive layer 106 may include at least one of copper, aluminum, carbon fiber, and/or graphene. The thermally conductive layer 106 of FIGS. 1 and 2 distributes heat to be transferred between the first thermally insulating layer 102 and the second thermally insulating layer 104 of the multi-layer thermal insulator 100 of FIGS. 1 and 2. In some examples, the thermally conductive layer 106 reduces the formation of one or more localized hot spot(s) in at least one of the first thermally insulating layer 102 or the second thermally insulating layer 104. For example, heat applied at an example local area 116 of the first thermally insulating layer 102 may transfer through the thickness of the first thermally insulating layer 102 to the thermally conductive layer 106. In such an example, the thermally conductive layer 106 distributes and/or spreads the transferred heat across (e.g., along the length indicated as the dimension "L" in FIGS. 1 and 2, and/or along the width indicated as the dimension "W" in FIG. 2) the thermally conductive layer 106. As a result of the transferred heat being distributed and/or spread across the thermally conductive layer 106, the distributed heat is subsequently transferred from the thermally conductive layer 106 to the second thermally insulating layer 104 of FIGS. 1 and 2 across a wider area than would otherwise be the case in the absence of the distribution and/or spreading of the transferred heat by the thermally conductive layer 106. In the foregoing example, the thermally conductive layer 106 accordingly reduces the potential formation of one or more localized hot spot(s) in the second thermally insulating layer 104.

In the illustrated example of FIG. 1, the thermally conductive layer 106 of the multi-layer thermal insulator 100 is coupled and/or connected to an example heat sink 118. The heat sink 118 of FIG. 1 absorbs, dissipates and/or removes heat from the thermally conductive layer 106 of the multi-layer thermal insulator 100. In some examples, the heat sink 118 may include a plurality of separated fins (e.g., a first example fin 120 is shown in FIG. 1) arranged and/or configured to receive an airflow passing along the heat sink 118. In some examples, the separated fins (e.g., the first fin 120 of FIG. 1) are oriented in a direction that is generally parallel to the length (indicated as the dimension "L" in FIG. 1) of the multi-layer thermal insulator 100. In some examples, the heat sink 118 may be formed of copper or aluminum. The heat sink 118 and/or the separated fins of the heat sink 118 of FIG. 1 may be of any size, shape, and/or configuration.

In the illustrated example of FIG. 1, the second thermally insulating layer 104 of the multi-layer thermal insulator 100 is adjacent (e.g., abuts and/or is in contact with) an example wall 122 having an example interior surface 124 and an example exterior surface 126. As further described below in connection with FIGS. 5 and 6, the wall 122 of FIG. 1 may be an inner wall of a composite thrust reverser of an aircraft engine. In the illustrated example of FIG. 1, the second thermally insulating layer 104 of the multi-layer thermal insulator 100 is adjacent the interior surface 124 of the wall 122, and the heat sink 118 is adjacent the exterior surface 126 of the wall 122. In some examples, the interior surface 124 of the wall 122 may be exposed to a first temperature, and the exterior surface 126 of the wall 122 may be exposed to a second temperature that is lower (e.g., cooler) than the first temperature.

Figure 3:
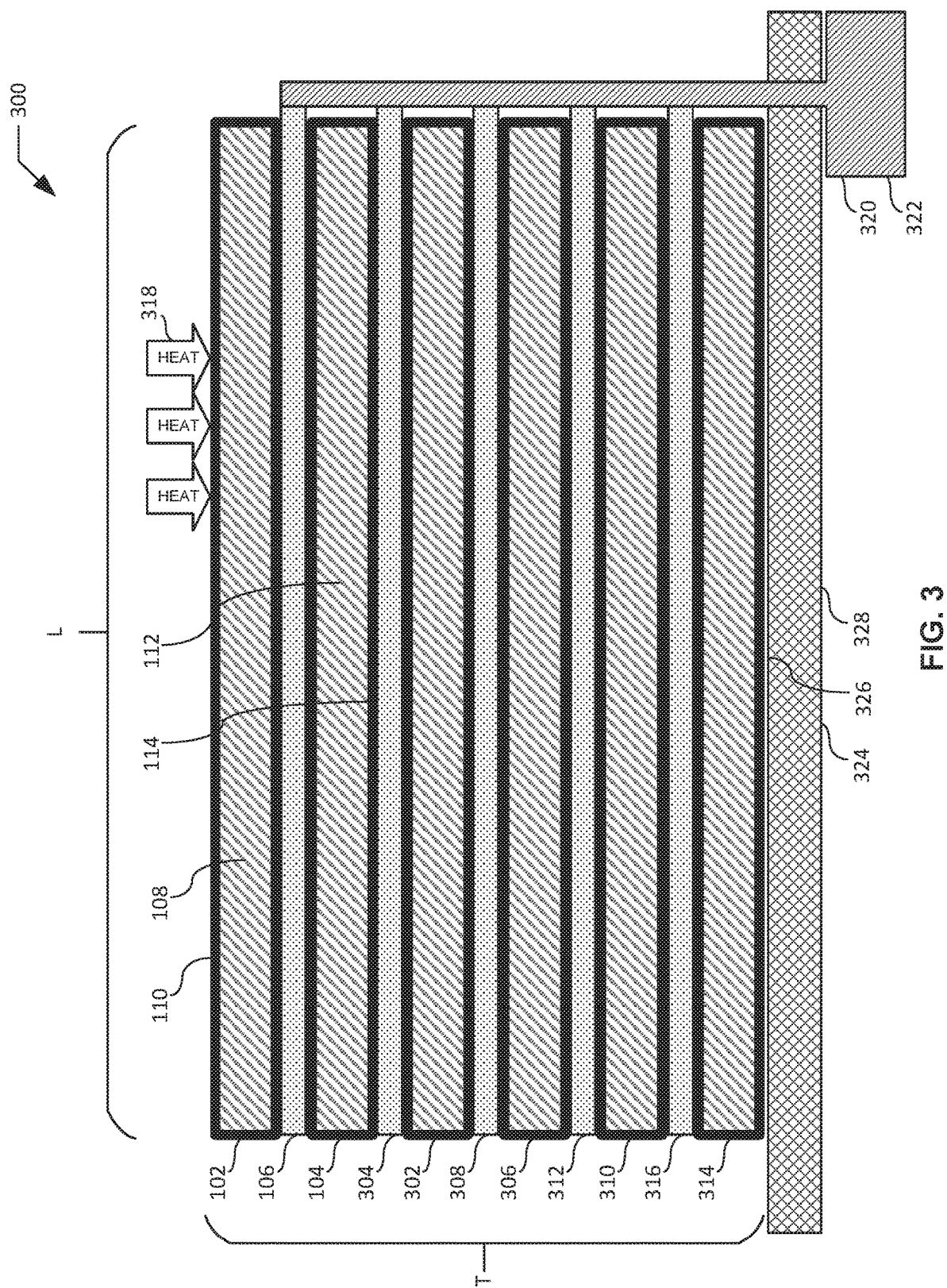
FIG. 3 is a cross-sectional view illustrating a second example multi-layer thermal insulator constructed in accordance with the teachings of this disclosure.
Figure 4:
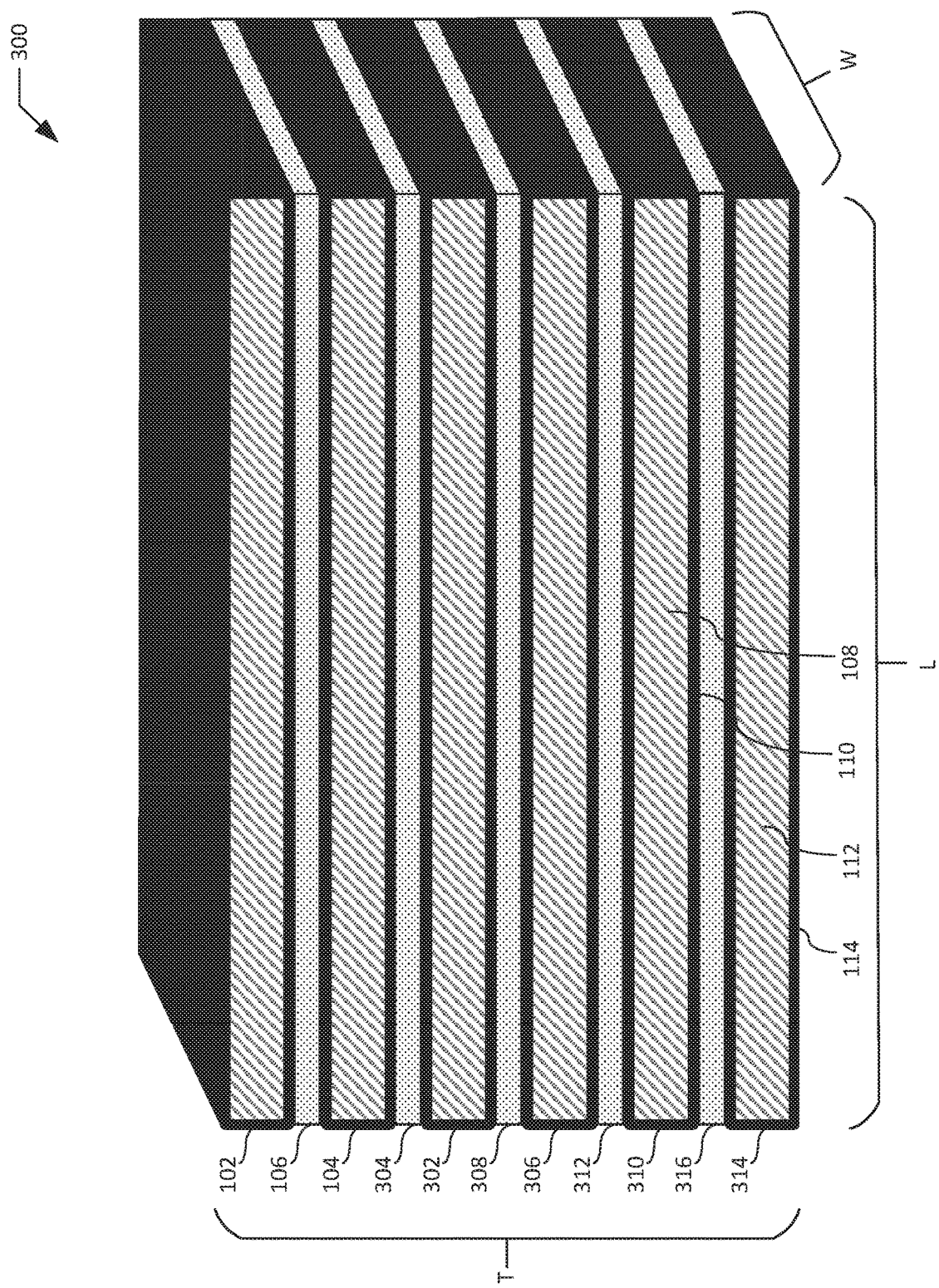
FIG. 4 is a perspective view of the second example multi-layer thermal insulator of FIG. 3.

FIG. 3 is a cross-sectional view illustrating a second example multi-layer thermal insulator 300 constructed in accordance with the teachings of this disclosure. FIG. 4 is a perspective view of the multi-layer thermal insulator 300 of FIG. 3. The multi-layer thermal insulator 300 of FIGS. 3 and 4 includes the first thermally insulating layer 102, the second thermally insulating layer 104, and the first thermally conductive layer 106 described above in connection with the multi-layer thermal insulator 100 of FIGS. 1 and 2. The multi-layer thermal insulator 300 of FIGS. 3 and 4 further includes a third example thermally insulating layer 302, a second example thermally conductive layer 304, a fourth example thermally insulating layer 306, a third example thermally conductive layer 308, a fifth example thermally insulating layer 310, a fourth example thermally conductive layer 312, a sixth example thermally insulating layer 314, and a fifth example thermally conductive layer 316.

The multi-layer thermal insulator 300 of FIGS. 3 and 4 has an example length (indicated as the dimension "L" in FIGS. 3 and 4), an example width (indicated as the dimension "W" in FIG. 4), and an example thickness (indicated as the dimension "T" in FIGS. 3 and 4). The first thermally insulating layer 102, the second thermally insulating layer 104, the first thermally conductive layer 106, the third thermally insulating layer 302, the second thermally conductive layer 304, the fourth thermally insulating layer 306, the third thermally conductive layer 308, the fifth thermally insulating layer 310, the fourth thermally conductive layer 312, the sixth thermally insulating layer 314, the fifth thermally conductive layer 316, and/or, more generally, the multi-layer thermal insulator 300 of FIGS. 3 and 4 may be of any size and/or shape, including the size(s) and shapes(s) illustrated in connection with FIGS. 3 and 4.

In the illustrated example of FIGS. 3 and 4, the first thermally conductive layer 106 of the multi-layer thermal insulator 300 is adjacent (e.g., abuts and/or is in contact with) both the first thermally insulating layer 102 and the second thermally insulating layer 104 of the multi-layer thermal insulator 300. Similarly, the second thermally conductive layer 304 is adjacent both the second thermally insulating layer 104 and the third thermally insulating layer 302, the third thermally conductive layer 308 is adjacent both the third thermally insulating layer 302 and the fourth thermally insulating layer 306, the fourth thermally conductive layer 312 is adjacent both the fourth thermally insulating layer 306 and the fifth thermally insulating layer 310, and the fifth thermally conductive layer 316 is adjacent both the fifth thermally insulating layer 310 and the sixth thermally insulating layer 314. In other examples, one or more gap(s) may exist between the first thermally conductive layer 106 and one or more of the first thermally insulating layer 102 and/or the second thermally insulating layer 104, between the second thermally conductive layer 304 and one or more of the second thermally insulating layer 104 and/or the third thermally insulating layer 302, between the third thermally conductive layer 308 and one or more of the third thermally insulating layer 302 and/or the fourth thermally insulating layer 306, between the fourth thermally conductive layer 312 and one or more of the fourth thermally insulating layer 306 and/or the fifth thermally insulating layer 310, and/or between the fifth thermally conductive layer 316 and one or more of the fifth thermally insulating layer 310 and/or the sixth thermally insulating layer 314. In some examples, the first thermally conductive layer 106 may be coupled (e.g., joined, fastened, bonded, etc.) to one or more of the first thermally insulating layer 102 and/or the second thermally insulating layer 104, the second thermally conductive layer 304 may be coupled to one or more of the second thermally insulating layer 104 and/or the third thermally insulating layer 302, the third thermally conductive layer 308 may be coupled to one or more of the third thermally insulating layer 302 and/or the fourth thermally insulating layer 306, the fourth thermally conductive layer 312 may be coupled to one or more of the fourth thermally insulating layer 306 and/or the fifth thermally insulating layer 310, and the fifth thermally conductive layer 316 may be coupled to one or more of the fifth thermally insulating layer 310 and/or the sixth thermally insulating layer 314.

In some examples, the multi-layer thermal insulator 300 of FIGS. 3 and 4 may include one or more additional thermally insulating layer(s) and/or one or more additional thermally conductive layer(s). For example, the multi-layer thermal insulator 300 of FIGS. 3 and 4 may further include a seventh thermally insulating layer, and a sixth thermally conductive layer positioned between and adjacent to the seventh thermally insulating layer and one of the first or sixth thermally insulating layers 102, 314 of FIGS. 3 and 4. In other examples, the multi-layer thermal insulator 300 of FIGS. 3 and 4 may have fewer thermally insulating layers and/or fewer thermally conductive layers relative to the number of thermally insulating layers and thermally conductive layers shown in FIGS. 3 and 4. For example, the multi-layer thermal insulator 300 of FIGS. 3 and 4 may lack the sixth thermally insulating layer 314 and the fifth thermally conductive layer 316 shown in FIGS. 3 and 4.

In the illustrated example of FIGS. 3 and 4, the first thermally insulating layer 102 includes the first insulating material 108 and the first face sheet material 110 of FIGS. 1 and 2, and the second thermally insulating layer 104 includes the second insulating material 112 and the second face sheet material 114 of FIGS. 1 and 2. Respective ones of the third thermally insulating layer 302, the fourth thermally insulating layer 306, the fifth thermally insulating layer 310, and the sixth thermally insulating layer 314 of FIGS. 3 and 4 may similarly include corresponding insulating materials and face sheet materials. For example, the third thermally insulating layer 302 may include a third insulating material and a third face sheet material, the fourth thermally insulating layer 306 may include a fourth insulating material and a fourth face sheet material, and so on.

In some examples, the insulating material(s) of respective ones of the thermally insulating layers of the multi-layer thermal insulator 300 of FIGS. 3 and 4 may be the same. For example, the respective insulating materials) of the first, second, third, fourth, fifth and sixth thermally insulating layers 102, 104, 302, 306, 310, 314 of FIGS. 3 and 4 may be the same. In other examples, the insulating material(s) of respective ones of the thermally insulating layers of the multi-layer thermal insulator 300 of FIGS. 3 and 4 may differ from one another. For example, the respective insulating material(s) of one or more of the second, third, fourth, fifth and/or sixth thermally insulating layer(s) 104, 302, 306, 310, 314 of FIGS. 3 and 4 may differ from the first insulating material 108 of the first thermally insulating layer 102 of FIGS. 3 and 4.

In some examples, the face sheet material(s) of respective ones of the thermally insulating layers of the multi-layer thermal insulator 300 of FIGS. 3 and 4 may be the same. For example, the respective face sheet materials) of the first, second, third, fourth, fifth and sixth thermally insulating layers 102, 104, 302, 306, 310, 314 of FIGS. 3 and 4 may be the same. In other examples, the face sheet material(s) of respective ones of the thermally insulating layers of the multi-layer thermal insulator 300 of FIGS. 3 and 4 may differ from one another. For example, the respective face sheet material(s) of one or more of the second, third, fourth, fifth and/or sixth thermally insulating layer(s) 104, 302, 306, 310, 314 of FIGS. 3 and 4 may differ from the first face sheet material 110 of the first thermally insulating layer 102 of FIGS. 3 and 4. In some examples, the first face sheet material 110 of the first thermally insulating layer 102 of FIGS. 3 and 4 may be implemented as a fireproof material (e.g., steel, titanium, and/or nickel), and the respective face sheet material(s) of each of the second, third, fourth, fifth and sixth thermally insulating layer(s) 104, 302, 306, 310, 314 of FIGS. 3 and 4 may be implemented as polyimide and/or another non-fireproof material.

In the illustrated example of FIGS. 3 and 4, the first thermally conductive layer 106 is positioned between the first thermally insulating layer 102 and the second thermally insulating layer 104, the second thermally conductive layer 304 is positioned between the second thermally insulating layer 104 and the third thermally insulating layer 302, the third thermally conductive layer 308 is positioned between the third thermally insulating layer 302 and the fourth thermally insulating layer 306, the fourth thermally conductive layer 312 is positioned between the fourth thermally insulating layer 306 and the fifth thermally insulating layer 310, and the fifth thermally conductive layer 316 is positioned between the fifth thermally insulating layer 310 and the sixth thermally insulating layer 314.

In some examples, respective ones of the first, second, third, fourth and fifth thermally conductive layers 106, 304, 308, 312, 316 of FIGS. 3 and 4 may include at least one of copper, aluminum, carbon fiber, and/or graphene. In some examples, the conductive material(s) of respective ones of the thermally conductive layers of the multi-layer thermal insulator 300 of FIGS. 3 and 4 may be the same. For example, the respective conductive material(s) of the first, second, third, fourth and fifth thermally conductive layers 106, 304, 308, 312, 316 of FIGS. 3 and 4 may be the same. In other examples, the conductive material(s) of respective ones of the thermally conductive layers of the multi-layer thermal insulator 300 of FIGS. 3 and 4 may differ from one another. For example, the respective conductive material(s) of one or more of the second, third, fourth and/or fifth thermally conductive layer(s) 304, 308, 312, 316 of FIGS. 3 and 4 may differ from the conductive material(s) of the first thermally conductive layer 106 of FIGS. 3 and 4.

Respective ones of the first, second, third, fourth and fifth thermally conductive layers 106, 304, 308, 312, 316 of FIGS. 3 and 4 distribute heat to be transferred between successive thermally insulating layers of the multi-layer thermal insulator 300 of FIGS. 3 and 4. For example, the first thermally conductive layer 106 distributes heat to be transferred between the first thermally insulating layer 102 and the second thermally insulating layer 104, the second thermally conductive layer 304 distributes heat to be transferred between the second thermally insulating layer 104 and the third thermally insulating layer 302, the third thermally conductive layer 308 distributes heat to be transferred between the third thermally insulating layer 302 and the fourth thermally insulating layer 306, and so on.

In some examples, respective ones of the first, second, third, fourth and fifth thermally conductive layers 106, 304, 308, 312, 316 of FIGS. 3 and 4 reduce the formation of one or more localized hot spot(s) in at least one of the first, second, third, fourth, fifth or sixth thermally insulating layers 102, 104, 302, 306, 310, 314 of FIGS. 3 and 4. For example, heat applied at an example local area 318 of the first thermally insulating layer 102 may transfer through the thickness of the first thermally insulating layer 102 to the first thermally conductive layer 106. In such an example, the first thermally conductive layer 106 distributes and/or spreads the transferred heat across (e.g., along the length indicated as the dimension "L" in FIGS. 3 and 4, and/or along the width indicated as the dimension "W" in FIG. 4) the first thermally conductive layer 106. As a result of the transferred heat being distributed and/or spread across the first thermally conductive layer 106, the distributed heat is subsequently transferred from the first thermally conductive layer 106 to the second thermally insulating layer 104 of FIGS. 3 and 4 across a wider area than would otherwise be the case in the absence of the distribution and/or spreading of the transferred heat by the first thermally conductive layer 106.

Continuing with the above example, the distributed heat received at the second thermally insulating layer 104 may transfer through the thickness of the second thermally insulating layer 104 to the second thermally conductive layer 304. In such an example, the second thermally conductive layer 304 further distributes and/or further spreads the distributed heat across (e.g., along the length indicated as the dimension "L" in FIGS. 3 and 4, and/or along the width indicated as the dimension "W" in FIG. 4) the second thermally conductive layer 304. As a result of the distributed heat being further distributed and/or further spread across the second thermally conductive layer 304, the further distributed heat is subsequently transferred from the second thermally conductive layer 304 to the third thermally insulating layer 302 of FIGS. 3 and 4 across a wider area than would otherwise be the case in the absence of the further distribution and/or further spreading of the distributed heat by the second thermally conductive layer 304. The above-described heat distribution process may continue to occur at successive alternating layers (e.g., alternating thermally conductive layers and thermally insulating layers) of the multi-layer thermal insulator 300 of FIGS. 3 and 4, Thus, in the above-described example, one or more of the first, second, third, fourth and/or fifth thermally conductive layer(s) 106, 304, 308, 312, 316 of FIGS. 3 and 4 reduce(s) the potential formation of one or more localized hot spot(s) in one or more of the second, third, fourth, fifth and/or sixth thermally insulating layer(s) 104, 302, 306, 310, 314 of FIGS. 3 and 4.

In the illustrated example of FIG. 3, respective ones of the first, second, third, fourth and fifth thermally conductive layers 106, 304, 308, 312, 316 of the multi-layer thermal insulator 300 are coupled and/or connected to an example heat sink 320. The heat sink 320 of FIG. 3 absorbs, dissipates and/or removes heat from one or more of the first, second, third, fourth and/or fifth thermally conductive layer(s) 106, 304, 308, 312, 316 of the multi-layer thermal insulator 300. In some examples, the heat sink 320 may include a plurality of separated fins (e.g., a first example fin 322 is shown in FIG. 3) arranged and/or configured to receive an airflow passing along the heat sink 320. In some examples, the separated fins (e.g., the first fin 322 of FIG. 3) are oriented in a direction that is generally parallel to the length (indicated as the dimension "L" in FIG. 3) of the multi-layer thermal insulator 300. In some examples, the heat sink 320 may be formed of copper or aluminum. The heat sink 320 and/or the separated fins of the heat sink 320 of FIG. 3 may be of any size, shape, and/or configuration.

In other examples, less than all of the first, second, third, fourth and fifth thermally conductive layers 106, 304, 308, 312, 316 of the multi-layer thermal insulator 300 may be coupled and/or connected to the heat sink 320. In still other examples, respective ones of the first, second, third, fourth and fifth thermally conductive layers 106, 304, 308, 312, 316 may be coupled and/or connected to separate corresponding respective heat sinks. For example, the first thermally conductive layer 106 may be coupled and/or connected to a first heat sink (e.g., the heat sink 320 of FIG. 3), the second thermally conductive layer 304 may be coupled and/or connected to second heat sink, and so on.

In the illustrated example of FIG. 3, the sixth thermally insulating layer 314 of the multi-layer thermal insulator 300 is adjacent (e.g., abuts and/or is in contact with) an example wall 324 including an example interior surface 326 and an example exterior surface 328. As further described below in connection with FIGS. 5 and 6, the wall 324 of FIG. 3 may be an inner wall of a composite thrust reverser of an aircraft engine. In the illustrated example of FIG. 3, the sixth thermally insulating layer 314 of the multi-layer thermal insulator 300 is adjacent the interior surface 326 of the wall 324, and the heat sink 320 is adjacent the exterior surface 328 of the wall 324. In some examples, the interior surface 326 of the wall 324 may be exposed to a first temperature, and the exterior surface 328 of the wall 324 may be exposed to a second temperature that is lower (e.g., cooler) than the first temperature.

Figure 5:
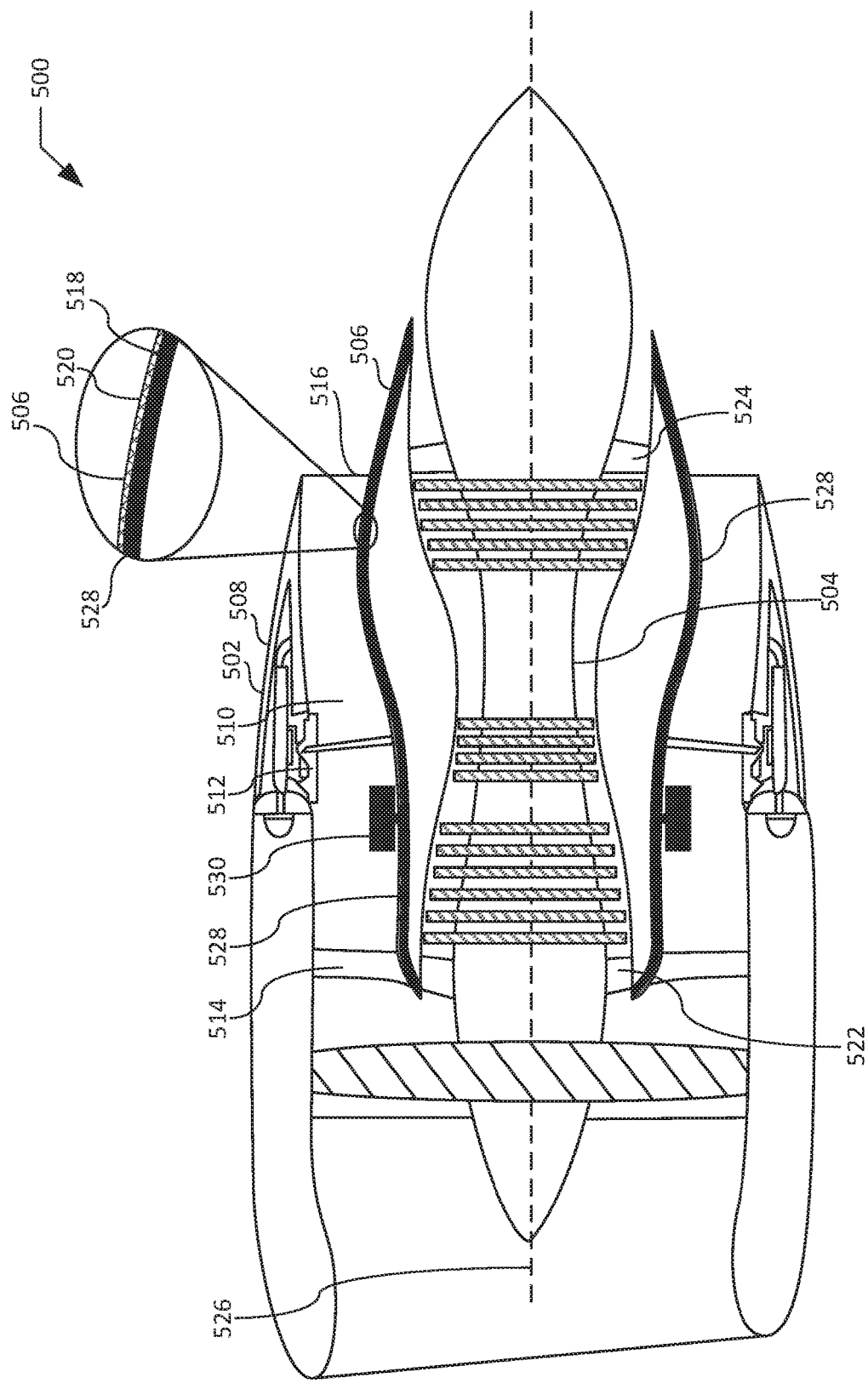
FIG. 5 is a cross sectional view of an example aircraft engine in which the first example multi-layer thermal insulator of FIGS. 1 and 2, and/or the second example multi-layer thermal insulator of FIGS. 3 and 4, may be implemented in accordance with the teachings of this disclosure.

FIG. 5 is a cross sectional view of an example aircraft engine 500 in which the first example multi-layer thermal insulator 100 of FIGS. 1 and 2, and/or the second example multi-layer thermal insulator 300 of FIGS. 3 and 4, may be implemented in accordance with the teachings of this disclosure. In the illustrated example of FIG. 5, the aircraft engine 500 includes an example composite thrust reverser 502 and an example core 504. The composite thrust reverser 502 partially and/or fully surrounds the core 504 of the aircraft engine 500. In some examples, the composite thrust reverser 502 is formed as a pair of opposing C-shaped compartments that partially and/or fully surround the core 504 of the aircraft engine 500.

Figure 6:
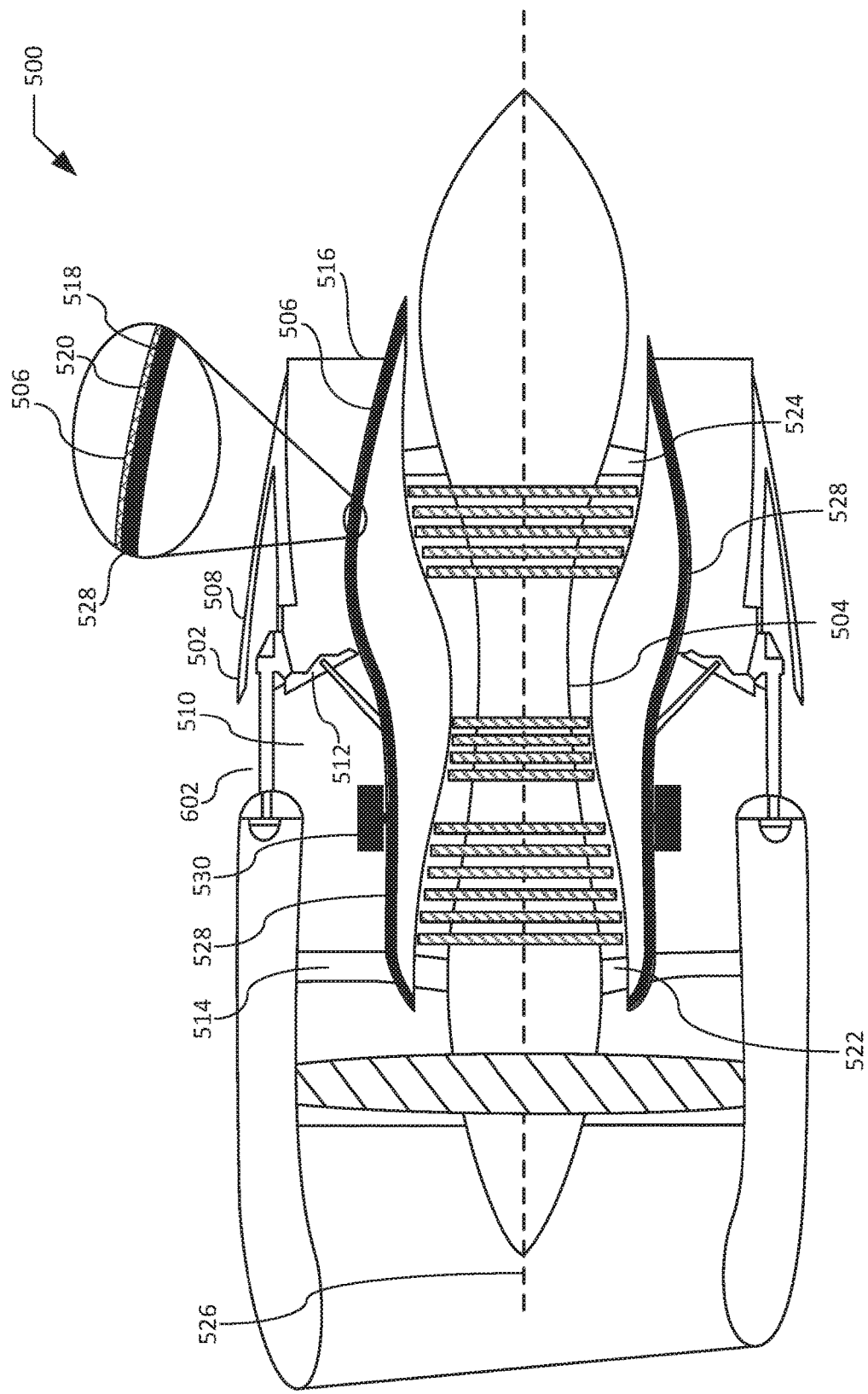
FIG. 6 is a cross sectional view of the example aircraft engine of FIG. 5 in which the example blocker door of the example composite thrust reverser of the aircraft engine is in a blocking position.

In the illustrated example of FIG. 5, the composite thrust reverser 502 includes an example inner wall 506, an example outer wall 508, an example bypass duct 510 located between the inner wall 506 and the outer wall 508, and an example blocker door 512. FIG. 5 illustrates the blocker door 512 of the composite thrust reverser 502 in a non-blocking position. When the blocker door 512 is in the non-blocking position shown in FIG. 5, air is able to flow into an example intake segment 514 of the bypass duct 310, through the bypass duct 510, and out of an example exhaust segment 516 of the bypass duct 510. FIG. 6 is a cross sectional view of the example aircraft engine 500 of FIG. 5 in which the example blocker door 512 of the example composite thrust reverser 502 is in a blocking position. When the blocker door 512 is in the blocking position shown in FIG. 5, air flowing into the intake segment 514 of the bypass duct 510 is generally blocked from flowing through the bypass duct 510 and/or out of the exhaust segment 516 of the bypass duct 510. Instead, when the blocker door 512 is in the blocking position shown in FIG. 6, air flowing into the intake segment 514 of the bypass duct 510 flows through a portion of the bypass duct 510 and out of an example thrust reversal opening 602 of the composite thrust reverser 502 and/or the bypass duct 510.

In the illustrated example of FIGS. 5 and 6, the inner wall 506 of the composite thrust reverser 502 includes an example interior surface 518 and an example exterior surface 520. The interior surface 518 of the inner wall 506 faces and/or is generally directed toward the core 504 of the aircraft engine 500. The exterior surface 520 of the inner wall 506 faces and/or is generally directed toward the outer wall 508 of the composite thrust reverser 502 of the aircraft engine 500. In some examples, the inner wall 506, the interior surface 518 and the exterior surface 520 may respectively be implemented by corresponding ones of the wall 122, the interior surface 124, and the exterior surface 126 of FIG. 1, and/or as corresponding ones of the wall 324, the interior surface 326, and the exterior surface 328 of FIG. 3.

In the illustrated example of FIGS. 5 and 6, the core 504 of the aircraft engine 500 includes an example intake nozzle 522 and an example exhaust nozzle 524. In the illustrated example of FIGS. 5 and 6, the intake nozzle 522 and the exhaust nozzle 524 define an example longitudinal axis 526 of the core 504 and/or, more generally, of the aircraft engine 500. In some examples, the core 504 generates and/or emits heat in one or more direction(s) that is/are generally away from (e.g., transverse to) the longitudinal axis 526 of FIGS. 5 and 6, and/or toward the interior surface 518 of the inner wall 506 of the composite thrust reverser 502 of FIGS. 5 and 6. In some examples, the core 504 may generate and/or emit heat in the range of four hundred to six hundred degrees Fahrenheit (400° F. 600° F.) during typical operation of the aircraft engine 500, and up to one thousand degrees Fahrenheit (1000° F.) as a result of various failure conditions of the aircraft engine 500. In contrast, a substantially cooler flow of air passes through the bypass duct 510 of the composite thrust reverser 502. The interior surface 518 of the inner wall 506 of the composite thrust reverser 502 may accordingly be exposed to a first temperature that is substantially higher (e.g., warmer) relative to a second temperature to which the exterior surface 520 of the inner wall 506 of the composite thrust reverser 502 may be exposed.

In the illustrated example of FIGS. 5 and 6, one or example multi-layer thermal insulator(s) 528 is/are positioned along the interior surface 518 of the inner wall 506 of the composite thrust reverser 502. In some examples, the multi-layer thermal insulator(s) 528 of FIGS. 5 and 6 may be implemented by the first example multi-layer thermal insulator 100 of FIGS. 1 and 2, and/or as the second example multi-layer thermal insulator 300 of FIGS. 3 and 4. In the illustrated example of FIGS. 5 and 6, the multi-layer thermal insulator(s) 528 extend(s) longitudinally (e.g., along the longitudinal axis 526 of FIGS. 5 and 6) along the interior surface 518 of the inner wall 506 of the composite thrust reverser 502 between the intake nozzle 522 and the exhaust nozzle 524 of the core 504 of the aircraft engine 500.

As described above in connection with the first example multi-layer thermal insulator 100 of FIGS. 1 and 2, and/or the second example multi-layer thermal insulator 300 of FIGS. 3 and 4, respective ones of the one or more multi-layer thermal insulator(s) 528 of FIGS. 5 and 6 include at least a first thermally insulating layer (e.g., the first thermally insulating layer 102 of FIGS. 1-4), a second thermally insulating layer (e.g., the second thermally insulating layer 104 of FIGS. 1-4), and a thermally conductive layer (e.g., the thermally conductive layer 106 of FIGS. 1-4) positioned between and adjacent to the first thermally insulating layer and the second thermally insulating layer. In the illustrated example of FIGS. 5 and 6, heat generated and/or emitted by the core 504 of the aircraft engine 500 is applied to the first thermally insulating layer(s) of respective ones of the multi-layer thermal insulator(s) 528. For each of the one or more multi-layer thermal insulator(s) 528 to which heat is applied, the applied heat is transferred from the first thermally insulating layer of the multi-layer thermal insulator 528 to the thermally conductive layer of the multi-layer thermal insulator 528, and then distributed across the thermally conductive layer of the multi-layer thermal insulator 528. The distributed heat is then transferred from the thermally conductive layer of the multi-layer thermal insulator 528 to the second thermally insulating layer of the multi-layer thermal insulator 528.

As further described above in connection with FIGS. 3 and 4, the process by which respective ones of the one or more multi-layer thermal insulator(s) 528 of FIGS. 5 and 6 distribute heat may continue to occur at successive alternating layers (e.g., alternating thermally conductive layers and thermally insulating layers) of the respective ones of the multi-layer thermal insulator(s) 528. Thus, for each of the one or more multi-layer thermal insulator(s) 528 to which heat is applied, one or more thermally conductive layer(s) (e.g., the first, second, third, fourth and/or fifth thermally conductive layer(s) 106, 304, 308, 312, 316 of the multi-layer thermal insulator 300 of FIGS. 3 and 4) of the multi-layer thermal insulator 528 duce(s) the potential formation of one or more localized hot spot(s) in one or more thermally insulating layer(s) (e.g., the second, third, fourth, fifth and/or sixth thermally insulating layer(s) 104, 302, 306, 310, 314 of the multi-layer thermal insulator 300 of FIGS. 3 and 4) of the multi-layer thermal insulator 528.

In the illustrated example of FIGS. 5 and 6, the composite thrust reverser 502 and/or, more generally, the aircraft engine 500, further includes an example heat sink 530 to which one or more thermally conductive layer(s) of respective ones of the one or more multi-layer thermal insulator(s) 528 is/are coupled and/or connected. In some examples, the heat sink 530 of FIGS. 5 and 6 may be implemented by the example heat sink 118 of FIG. 1, and/or as the example heat sink 320 of FIG. 3. The heat sink 530 extends into and/or is positioned within the bypass duct 510 of the composite thrust reverser 502. In the illustrated example of FIGS. 5 and 5, the heat sink 530 is located forward of the blocker door 512 and/or the thrust reversal opening 502 of the composite thrust reverser 502. This example forward location of the heat sink 530 advantageously enables the heat sink 530 to be exposed to relatively cool air traveling through the bypass duct 510 even when the blocker door 512 of the composite thrust reverser 502 is in the blocking position shown in FIG. 6. The heat sink 530 of FIGS. 5 and 6 is accordingly able to dissipate and/or remove heat from the thermally conductive layer(s) of respective ones of the one or more multi-layer thermal insulator(s) 528 in an effective manner regardless of the position of the blocker door 512 of the composite thrust reverser 502.

Figure 7:
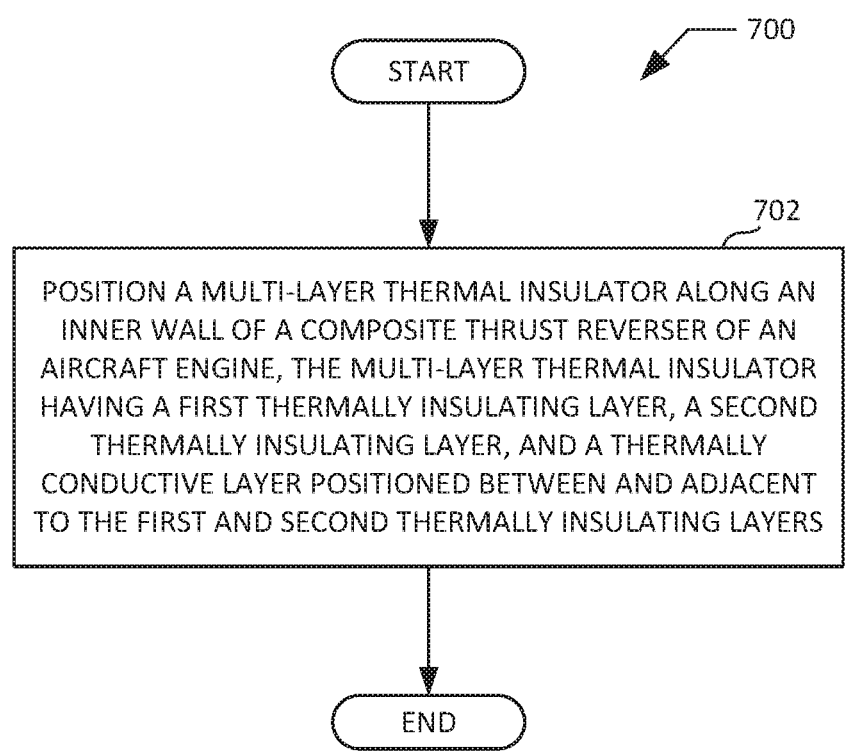
FIG. 7 is a flowchart representative of an example method for positioning the first example multi-layer thermal insulator of FIGS. 1 and 2, and/or the second example multi-layer thermal insulator of FIGS. 3 and 4, in an aircraft engine.

FIG. 7 is a flowchart representative of an example method 700 for positioning the first example multi-layer thermal insulator 100 of FIGS. 1 and 2, and/or the second example multi-layer thermal insulator 300 of FIGS. 3 and 4, in an aircraft engine. The method 700 of FIG. 7 includes positioning a multi-layer thermal insulator along an inner wall of a composite thrust reverser of an aircraft engine, the multi-layer thermal insulator having a first thermally insulating layer, a second thermally insulating layer, and a thermally conductive layer positioned between and adjacent to the first and second thermally insulating layers (block 702). For example, the multi-layer thermal insulator 528 of FIGS. 5 and 6 may be positioned along the interior surface 518 of the inner wall 506 of the composite thrust reverser 502 of the aircraft engine 500 of FIGS. 5 and 6. Following block 702, the example method 700 of FIG. 7 ends.

In some examples of the method 700 of FIG. 7, the multi-layer thermal insulator 528 of FIGS. 5 and 6 may be implemented by the first example multi-layer thermal insulator 100 of FIGS. 1 and 2, including the first thermally insulating layer 102, the second thermally insulating layer 104, and the thermally conductive layer 106. In some such examples, the second thermally insulating layer 104 of the multi-layer thermal insulator 100 may be positioned adjacent (e.g., abutting and/or contacting) the interior surface 518 of the inner wall 506 of the composite thrust reverser 502 of FIGS. 5 and 6.

In other examples of the method 700 of FIG. 7, the multi-layer thermal insulator 528 of FIGS. 5 and 6 may be implemented by the second example multi-layer thermal insulator 300 of FIGS. 3 and 4, including the first thermally insulating layer 102, the second thermally insulating layer 104, the first thermally conductive layer 106, the third thermally insulating layer 302, the second thermally conductive layer 304, the fourth thermally insulating layer 306, the third thermally conductive layer 308, the fifth thermally insulating layer 310, the fourth thermally conductive layer 312, the sixth thermally insulating layer 314, and the fifth thermally conductive layer 316. In sonic such other examples, the sixth thermally insulating layer 314 of the multi-layer thermal insulator 300 may be positioned adjacent (e.g., abutting and/or contacting) the interior surface 518 of the inner wall 506 of the composite thrust reverser 502 of FIGS. 5 and 6.

In some examples of the method 700 of FIG. 7, the multi-layer thermal insulator 528 of FIGS. 5 and 6 may be positioned along the interior surface 518 of the inner wall 506 of the composite thrust reverser 502 of FIGS. 5 and 6 such that the multi-layer thermal insulator 528 extends longitudinally along the inner wall 506 between the intake nozzle 522 and the exhaust nozzle 524 of the core 504 of the aircraft engine 500 of FIGS. 5 and 6.

In some examples of the method 700 of FIG. 7, the multi-layer thermal insulator 528 of FIGS. 5 and 6 may be positioned along the interior surface 518 of the inner wall 506 of the composite thrust reverser 502 of FIGS. 5 and 6 such that one or more thermally conductive layer(s) of the multi-layer thermal insulator 528 is/are coupled and/or connected to the heat sink 530 of FIGS. 5 and 6. In some such examples, the heat sink 530 extends into and/or is located within the bypass duct 510 of the composite thrust reverser 502 of FIGS. 5 and 6. In some such examples, the heat sink 530 is located forward of the blocker door 512 and/or the thrust reversal opening 602 of the composite thrust reverser 502 of FIGS. 5 and 6.

Figure 8:
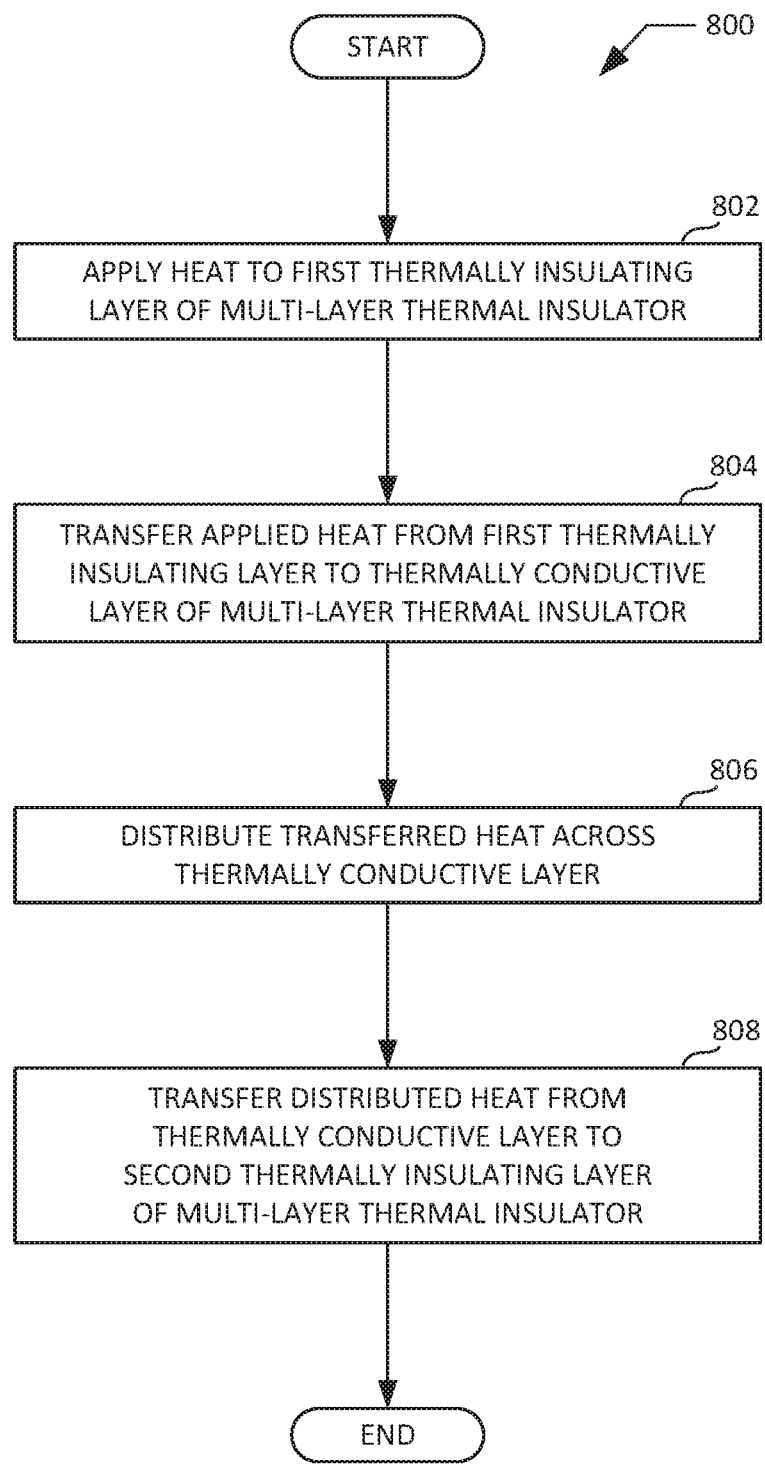
FIG. 8 is a flowchart representative of an example method for distributing heat via the first example multi-layer thermal insulator of FIGS. 1 and 2 and/or the second example multi-layer thermal insulator of FIGS. 3 and 4.

FIG. 8 is a flowchart representative of an example method 800 for distributing heat via the first example multi-layer thermal insulator 100 of FIGS. 1 and 2, and/or the second example multi-layer thermal insulator 300 of FIGS. 3 and 4. The method 800 of FIG. 8 begins with applying heat to a first thermally insulating layer of a multi-layer thermal insulator (block 802). For example, heat generated and/or emitted from source of heat (e.g., from the core 504 of the aircraft engine 500 of FIGS. 5 and 6) may be applied to the first thermally insulating layer 102 of the first example multi-layer thermal insulator 100 of FIGS. 1 and 2. As another example, heat generated and/or emitted from source of heat may be applied to the first thermally insulating layer 102 of the second example multi-layer thermal insulator 300 of FIGS. 3 and 4.

The method 800 of FIG. 8 includes transferring the applied heat from the first thermally insulating layer to a thermally conductive layer of the multi-layer thermal insulator positioned between and adjacent to the first thermally insulating layer and a second thermally insulating layer of the multi-layer thermal insulator (block 804). For example, heat applied to the first thermally insulating layer 102 of the first example multi-layer thermal insulator 100 of FIGS. 1 and 2 may transfer through the thickness of the first thermally insulating layer 102 to the thermally conductive layer 106 of the first example multi-layer thermal insulator 100 of FIGS. 1 and 2. As another example, heat applied to the first thermally insulating layer 102 of the second example multi-layer thermal insulator 300 of FIGS. 3 and 4 may transfer through the thickness of the first thermally insulating layer 102 to the first thermally conductive layer 106 of the second example multi-layer thermal insulator 300 of FIGS. 3 and 4.

The method 800 of FIG. 8 includes distributing the transferred heat across the thermally conductive layer (block 806). For example, the thermally conductive layer 106 of the first example multi-layer thermal insulator 100 of FIGS. 1 and 2 may distribute and/or spread the transferred heat across (e.g., along the length indicated as the dimension "L" in FIGS. 1 and 2, and/or along the width indicated as the dimension "W" in FIG. 2) the thermally conductive layer 106. As another example, the first thermally conductive layer 106 of the second example multi-layer thermal insulator 300 of FIGS. 3 and 4 may distribute and/or spread the transferred heat across (e.g., along the length indicated as the dimension "L" in FIGS. 3 and 4, and/or along the width indicated as the dimension "W" in FIG. 4) the first thermally conductive layer 106.

The method 800 of FIG. 8 includes transferring the distributed heat from the thermally conductive layer to the second thermally insulating layer (block 808). For example, the distributed heat may be transferred from the thermally conductive layer 106 of the first example multi-layer thermal insulator 100 of FIGS. 1 and 2 to the second thermally insulating layer 104 of the first example multi-layer thermal insulator 100 of FIGS. 1 and 2. As another example, the distributed heat may be transferred from the first thermally conductive layer 106 of the second example multi-layer thermal insulator 300 of FIGS. 3 and 4 to the second thermally insulating layer 104 of the second example multi-layer thermal insulator 300 of FIGS. 3 and 4. Following block 808, the example method 800 of FIG. 8 ends.

In some examples of the method 800 of FIG. 8, the thermally conductive layer of the multi-layer thermal insulator reduces the formation of localized hot spots in at least one of the first thermally insulating layer or the second thermally insulating layer. For example, by distributing heat across the thermally conductive layer 106 of the first example multi-layer thermal insulator 100 of FIGS. 1 and 2, the thermally conductive layer 106 may reduce the formation of one or more localized hot spot(s) in at least one of the first thermally insulating layer 102 or the second thermally insulating layer 104 of the first example multi-layer thermal insulator 100 of FIGS. 1 and 2. As another example, by distributing heat across the first thermally conductive layer 106 of the second example multi-layer thermal insulator 300 of FIGS. 3 and 4, the first thermally conductive layer 106 may reduce the formation of one or more localized hot spot(s) in at least one of the first thermally insulating layer 102, the second thermally insulating layer 104, the third thermally insulating layer 302, the fourth thermally insulating layer 306, the fifth thermally insulating layer 310, or the sixth thermally insulating layer 314 of the second example multi-layer thermal insulator 300 of FIGS. 3 and 4.

In some examples of the method 800 of FIG. 8, the multi-layer thermal insulator may be implemented as the multi-layer thermal insulator 528 of FIGS. 5 and 6. In some examples, the multi-layer thermal insulator 528 may be positioned along the interior surface 518 of the inner wall 506 of the composite thrust reverser 502 of FIGS. 5 and 6. In some such examples, the multi-layer thermal insulator 528 may be positioned such that the multi-layer thermal insulator 528 extends longitudinally along the inner wall 506 between the intake nozzle 522 and the exhaust nozzle 524 of the core 504 of the aircraft engine 500 of FIGS. 5 and 6. In some such examples, the multi-layer thermal insulator 528 may be positioned such that one or more thermally conductive layer(s) of the multi-layer thermal insulator 528 is/are coupled and/or connected to the heat sink 530 of FIGS. 5 and 6. In some such examples, the heat sink 530 may extend into and/or be located within the bypass duct 510 of the composite thrust reverser 502 of FIGS. 5 and 6. In some such examples, the heat sink 530 may be located forward of the blocker door 512 and/or the thrust reversal opening 602 of the composite thrust reverser 502 of FIGS. 5 and 6.

From the foregoing, it will be appreciated that the disclosed multi-layer thermal insulator apparatus and methods advantageously distribute heat across a multi-layer thermal insulator via a thermally conductive layer positioned between and adjacent to first and second thermally insulating layers of the multi-layer thermal insulator. As a result of heat being distributed across the thermally conductive layer of the multi-layer thermal insulator, the formation of localized hot spots within one or more thermally insulating layer(s) of the multi-layer thermal insulator is reduced (e.g., eliminated), thereby providing improved thermal protection relative to the conventional passive thermal protection systems described above. The disclosed multi-layer thermal insulator apparatus are accordingly able to provide a sufficient degree of thermal protection utilizing a multi-layer thermal insulator having a first thickness that is less than (e.g., thinner than) a second thickness of a conventional passive thermal protection system that would be required to provide the same degree of thermal protection. The disclosed multi-layer thermal insulator apparatus may also advantageously be implemented in a manner that is less costly and less susceptible to failure relative to the conventional active thermal protection systems described above.

In some examples, a multi-layer thermal insulator is disclosed. In some disclosed examples, the multi-layer thermal insulator comprises a first thermally insulating layer, a second thermally insulating layer, and a thermally conductive layer positioned between and adjacent to the first thermally insulating layer and the second thermally insulating layer. In some disclosed examples, the thermally conductive layer is to distribute heat to be transferred between the first thermally insulating layer and the second thermally insulating layer. In some disclosed examples, the thermally conductive layer is to reduce a formation of a localized hot spot in at least one of the first thermally insulating layer or the second thermally insulating layer. In some disclosed examples, thermally conductive layer is to be coupled to a heat sink.

In some disclosed examples, the first thermally insulating layer includes an insulating material and a fireproof material covering the insulating material.

In some disclosed examples, the multi-layer thermal insulator further comprises a third thermally insulating layer, and a second thermally conductive layer positioned between and adjacent to the second thermally insulating layer and the third thermally insulating layer.

In some disclosed examples, the multi-layer thermal insulator is to be positioned along an inner wall of a composite thrust reverser of an aircraft engine. In some disclosed examples, the multi-layer thermal insulator is to extend longitudinally along the inner wall between an intake nozzle and an exhaust nozzle of a core of the aircraft engine.

In some examples, an aircraft engine is disclosed. In some disclosed examples, the aircraft engine comprises a composite thrust reverser having an inner wall. In some disclosed examples, the aircraft engine further comprises a multi-layer thermal insulator positioned along the inner wall. In some disclosed examples, the multi-layer thermal insulator includes a first thermally insulating layer, a second thermally insulating layer, and a thermally conductive layer positioned between and adjacent to the first thermally insulating layer and the second thermally insulating layer.

In some disclosed examples, the multi-layer thermal insulator extends longitudinally along the inner wall between an intake nozzle and an exhaust nozzle of a core of the aircraft engine.

In some disclosed examples, the thermally conductive layer is to distribute heat to be transferred between the first thermally insulating layer and the second thermally insulating layer. In sonic disclosed examples, the thermally conductive layer is to reduce a formation of a localized hot spot in at least one of the first thermally insulating layer or the second thermally insulating layer. In some disclosed examples, the thermally conductive layer is coupled to a heat sink. In some disclosed examples, the heat sink extends into a bypass duct of the composite thrust reverser.

In some disclosed examples, the multi-layer thermal insulator further includes a third thermally insulating layer, and a second thermally conductive layer positioned between and adjacent to the second thermally insulating layer and the third thermally insulating layer.

In some examples, a method of positioning a multi-layer thermal insulator is disclosed. In some disclosed examples, the method comprises positioning a multi-layer thermal insulator along an inner wall of a composite thrust reverser of an aircraft engine. In some disclosed examples of the method, the multi-layer thermal insulator includes a first thermally insulating layer, a second thermally insulating layer, and a thermally conductive layer positioned between and adjacent to the first thermally insulating layer and the second thermally insulating layer.

In some disclosed examples of the method, the multi-layer thermal insulator is to extend longitudinally along the inner wall between an intake nozzle and an exhaust nozzle of a core of the aircraft engine.

In some disclosed examples of the method, the thermally conductive layer is to distribute heat to be transferred between the first thermally insulating layer and the second thermally insulating layer. In some disclosed examples of the method, the thermally conductive layer is to reduce a formation of a localized hot spot in at least one of the first thermally insulating layer or the second thermally insulating layer. In some disclosed examples of the method, the thermally conductive layer is to be coupled to a heat sink. In some disclosed examples of the method, the heat sink extends into a bypass duct of the composite thrust reverser.

In some disclosed examples of the method, the multi-layer thermal insulator further includes a third thermally insulating layer, and a second thermally conductive layer positioned between and adjacent to the second thermally insulating layer and the third thermally insulating layer.

In some examples, a method of distributing heat via a multi-layer thermal insulator is disclosed. In some disclosed examples, the method comprises applying heat to a first thermally insulating layer of a multi-layer thermal insulator. In some disclosed examples, the method further comprises transferring the applied heat from the first thermally insulating layer to a thermally conductive layer of the multi-layer thermal insulator positioned between and adjacent to the first thermally insulating layer and a second thermally insulating layer of the multi-layer thermal insulator. In some disclosed examples, the methods further comprises distributing the transferred heat across the thermally conductive layer. In some disclosed examples, the method further comprises transferring the distributed heat from the thermally conductive layer to the second thermally insulating layer.

In some disclosed examples of the method, the thermally conductive layer reduces a formation of a localized hot spot in at least one of the first thermally insulating layer or the second then ally insulating layer. In some disclosed examples of the method, the thermally conductive layer is coupled to a heat sink.

In some disclosed examples of the method, the multi-layer thermal insulator is positioned along an inner wall of a composite thrust reverser of an aircraft engine. In some disclosed examples of the method, the multi-layer thermal insulator extends longitudinally along the inner wall between an intake nozzle and an exhaust nozzle of a core of the aircraft engine.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An aircraft engine, comprising:
a composite thrust reverser having an inner wall, the inner wall having an interior surface and an exterior surface;
a multi-layer thermal insulator contacting and extending longitudinally along the interior surface of the inner wall, the multi-layer thermal insulator including:
a first thermally insulating layer having a first insulating material and a first fireproof face sheet coating opposing surfaces of the first insulating material;
a second thermally insulating layer having a second insulating material and a second fireproof face sheet coating opposing surfaces of the second insulating material; and
a thermally conductive layer positioned between and contacting the first fireproof face sheet of the first thermally insulating layer and the second fireproof face sheet of the second thermally insulating layer; and
a heat sink coupled to the thermally conductive layer, the heat sink including a fin positioned adjacent to and extending longitudinally along the exterior surface of the inner wall.

2. The aircraft engine of claim 1, wherein the thermally conductive layer is configured to distribute heat transferred between the first thermally insulating layer and the second thermally insulating layer.

3. The aircraft engine of claim 1, wherein the thermally conductive layer is configured to reduce a formation of a localized hot spot in at least one of the first thermally insulating layer or the second thermally insulating layer.

4. The aircraft engine of claim 1, wherein the thermally conductive layer is a first thermally conductive layer, and wherein the multi-layer thermal insulator further includes:
a third thermally insulating layer having a third insulating material and a third fireproof face sheet coating opposing surfaces of the third insulating material; and
a second thermally conductive layer positioned between and contacting the second fireproof face sheet of the second thermally insulating layer and the third fireproof face sheet of the third thermally insulating layer, the second thermally conductive layer being coupled to the heat sink.

5. The aircraft engine of claim 1, wherein the multi-layer thermal insulator extends longitudinally along the interior surface of the inner wall from an intake nozzle to an exhaust nozzle of a core of the aircraft engine.

6. The aircraft engine of claim 1, wherein the fin is located within a bypass duct of the composite thrust reverser.

7. The aircraft engine of claim 6, wherein the fin is positioned longitudinally forward of a thrust reversal opening of the bypass duct.

8. The aircraft engine of claim 7, wherein the fin is positioned longitudinally forward of a blocker door of the of the composite thrust reverser, the blocker door to selectively block the thrust reversal opening.

9. The aircraft engine of claim 1, wherein the second fireproof face sheet contacts the interior surface of the inner wall.

10. An aircraft engine, comprising:
a composite thrust reverser having an inner wall, an outer wall, and a bypass duct located between the inner wall and the outer wall, the inner wall having an interior surface and an exterior surface;
a multi-layer thermal insulator contacting and extending longitudinally along the interior surface of the inner wall, the multi-layer thermal insulator including:
a first thermally insulating layer having a first insulating material and a first fireproof face sheet coating opposing surfaces of the first insulating material;
a second thermally insulating layer having a second insulating material and a second fireproof face sheet coating opposing surfaces of the second insulating material; and
a thermally conductive layer positioned between and contacting the first fireproof face sheet of the first thermally insulating layer and the second fireproof face sheet of the second thermally insulating layer; and
a heat sink coupled to the thermally conductive layer, the heat sink extending from the thermally conductive layer through the inner wall and into the bypass duct, the heat sink including a fin located within the bypass duct, the fin positioned adjacent to and extending longitudinally along the exterior surface of the inner wall.

11. The aircraft engine of claim 10, wherein the multi-layer thermal insulator extends longitudinally along the interior surface of the inner wall from an intake nozzle to an exhaust nozzle of a core of the aircraft engine.

12. The aircraft engine of claim 10, wherein the thermally conductive layer is configured to distribute heat transferred between the first thermally insulating layer and the second thermally insulating layer.

13. The aircraft engine of claim 10, wherein the thermally conductive layer is configured to reduce a formation of a localized hot spot in at least one of the first thermally insulating layer or the second thermally insulating layer.

14. The aircraft engine of claim 10, wherein the thermally conductive layer is a first thermally conductive layer, and wherein the multi-layer thermal insulator further includes:
 a third thermally insulating layer having a third insulating material and a third fireproof face sheet coating opposing surfaces of the third insulating material; and
 a second thermally conductive layer positioned between and contacting the second fireproof face sheet of the second thermally insulating layer and the third fireproof face sheet of the third thermally insulating layer, the second thermally conductive layer being coupled to the heat sink.

15. The aircraft engine of claim 10, wherein the fin is positioned longitudinally forward of a blocker door of the of the composite thrust reverser, the blocker door to selectively block a thrust reversal opening of the bypass duct.

16. A method, comprising:
 positioning a multi-layer thermal insulator in contact with and extending longitudinally along an interior surface of an inner wall of a composite thrust reverser of an aircraft engine, the multi-layer thermal insulator including a first thermally insulating layer having a first insulating material and a first fireproof face sheet coating opposing surfaces of the first insulating material, a second thermally insulating layer having a second insulating material and a second fireproof face sheet coating opposing surfaces of the second insulating material, and a thermally conductive layer positioned between and contacting the first fireproof face sheet of the first thermally insulating layer and the second fireproof face sheet of the second thermally insulating layer, the thermally conductive layer being coupled to a heat sink, the heat sink including a fin positioned adjacent to and extending longitudinally along an exterior surface of the inner wall.

17. The method of claim 16, wherein the multi-layer thermal insulator extends longitudinally along the interior surface of the inner wall from an intake nozzle to an exhaust nozzle of a core of the aircraft engine.

18. The method of claim 16, further comprising:
 receiving heat at the thermally conductive layer from the first thermally insulating layer;
 distributing the received heat along the thermally conductive layer; and
 transferring the distributed heat from the thermally conductive layer to the second thermally insulating layer.

19. The method of claim 18, wherein distributing the received heat along the thermally insulating layer reduces a formation of a localized hot spot in at least one of the first thermally insulating layer or the second thermally insulating layer.

20. The method of claim 16, wherein the thermally insulating layer is a first thermally insulating layer, and wherein the multi-layer thermal insulator further includes:
 a third thermally insulating layer having a third insulating material and a third fireproof face sheet coating opposing surfaces of the third insulating material; and
 a second thermally conductive layer positioned between and contacting the second fireproof face sheet of the second thermally insulating layer and the third fireproof face sheet of the third thermally insulating layer, the second thermally conductive layer being coupled to the heat sink.

* * * * *